(12) United States Patent
Anerousis et al.

(10) Patent No.: US 9,070,106 B2
(45) Date of Patent: Jun. 30, 2015

(54) SYSTEM AND METHOD FOR DYNAMIC STRUCTURING OF PROCESS ANNOTATIONS

(75) Inventors: Nikolaos Anerousis, Chappaqua, NY (US); Milton H. Hernandez, Tenafly, NJ (US); Hani T. Jamjoon, White Plains, NY (US); Debanjan Saha, Mohegan Lake, NY (US); Ramendra K. Sahoo, Mohegan Lake, NY (US); Zon-Yin Shae, South Salem, NY (US); Anees A. Shaikh, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 2105 days.

(21) Appl. No.: 12/172,540

(22) Filed: Jul. 14, 2008

(65) Prior Publication Data

US 2010/0010790 A1    Jan. 14, 2010

(51) Int. Cl.
| | | |
|---|---|---|
| G06F 17/00 | (2006.01) | |
| G06F 17/30 | (2006.01) | |
| G06Q 10/10 | (2012.01) | |
| G06F 9/44 | (2006.01) | |

(52) U.S. Cl.
CPC ............... *G06Q 10/10* (2013.01); *G06F 17/00* (2013.01); *G06F 17/30* (2013.01); *G06F 8/10* (2013.01)

(58) Field of Classification Search
CPC ................................. G06F 17/00; G06F 17/30
USPC ............. 706/45–50; 715/719, 751, 233, 229, 715/205, 201, 230, 732, 234, 243; 709/203, 709/215–220; 707/705–711, 735–738, 707/777–780, 828–829, 913–917, 956–957, 707/694–695, 748, 757, 783
See application file for complete search history.

(56) References Cited

U.S. PATENT DOCUMENTS

| | | | |
|---|---|---|---|
| 6,289,362 B1 * | 9/2001 | Van Der Meer | 715/273 |
| 2001/0049671 A1 * | 12/2001 | Joerg | 706/50 |
| 2003/0050929 A1 * | 3/2003 | Bookman et al. | 707/7 |
| 2004/0125133 A1 * | 7/2004 | Pea et al. | 345/751 |
| 2005/0021348 A1 * | 1/2005 | Chan et al. | 705/1 |
| 2008/0016105 A1 * | 1/2008 | Freeland et al. | 707/102 |
| 2008/0154908 A1 * | 6/2008 | Datar et al. | 707/10 |
| 2008/0195657 A1 * | 8/2008 | Naaman et al. | 707/104.1 |

FOREIGN PATENT DOCUMENTS

WO         WO 02/25564        *    3/2002

OTHER PUBLICATIONS

Wikipedia—Wikipedia, the free encyclopedia, http://en.wikipedia.org/wiki/Wikipedia:Main_Page/Wikipedia.
YouTube—Wikipedia, the free encyclopedia, http://en.wikipedia.org/wiki/Youtube.

* cited by examiner

*Primary Examiner* — Srirama Channavajjala
(74) *Attorney, Agent, or Firm* — Ryan, Mason & Lewis, LLP

(57) ABSTRACT

A plurality of base templates is generated. Each of the base templates models a corresponding process. A plurality of instances of each of the base templates is instantiated. Each of the plurality of instances corresponds to an application of the corresponding process to a particular environment. Each of the instances of each of the base templates is annotated, based, in each case, upon observation of functioning of the instance in the particular environment.

25 Claims, 6 Drawing Sheets

SYSTEM AND METHOD FOR DYNAMIC STRUCTURING OF PROCESS ANNOTATIONS

FIELD OF THE INVENTION

The present invention relates to the electrical, electronic and computer arts, and, more particularly, to computer-aided process modeling and the like.

BACKGROUND OF THE INVENTION

Leveraging the collective knowledge of a large user-community can yield enormous intellectual capital (as evidenced, for example, by the well-known "Wikipedia," "YouTube," and the like). Fundamental to these successes are technologies that allow users to easily socialize their knowledge. However, leveraging these successes in processes, such as those in an enterprise, requires a significant transformation with regard to the role of community knowledge. Here, community knowledge needs to reflect changes to the processes and resources as seen by various workers. This knowledge, however, cannot be arbitrarily structured, but rather must be glued together by the underlying process or plan. Together, both pieces of information—the shared knowledge and the process-need to support process-related decisions.

SUMMARY OF THE INVENTION

Principles of the present invention provide techniques for dynamic structuring of process annotations. In one aspect, an exemplary method (which can be computer implemented) for dynamic structuring of process annotations includes the steps of generating a plurality of base templates, each of the base templates modeling a corresponding process; instantiating a plurality of instances of each of the base templates, each of the plurality of instances corresponding to an application of the corresponding process to a particular environment; and annotating each of the instances of each of the base templates, based, in each case, upon observation of functioning of the instance in the particular environment.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of a system (or apparatus) including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules. One or more embodiments make substantial use of software running on a general purpose computer.

One or more embodiments of the invention may offer one or more of the following technical benefits:
- allows users to associate any unlimited number of tags with any annotations
- automatically creates profile options based on the aggregation of tags
- scopes annotated content based on the selection of tags
- ranks annotations based on their closeness to a user profile
- uses multiple tags to define collaboration groups (using profile interest)
- concurrently enriches processes
- enforces structured growth of the process knowledge base
- enables continuous improvement to keep with the changing nature of the underlying processes.

These and other features, aspects and advantages of the present invention will become apparent from the following detailed description of illustrative embodiments thereof, which is to be read in connection with the accompanying drawings.

DETAILED DESCRIPTION OF PREFERRED EMBODIMENTS

One or more embodiments of the invention address the role of the control plane (captured by the underling process models) in the structuring of community knowledge. In essence, one or more embodiments of the invention work by accepting process models as base templates, with the assumption that these templates capture general enterprise-related tasks. These templates, however, can be instantiated by multiple users concurrently to reflect specific variations and/or information that arises when such processes are applied to a specific technology, account, project, and the like (henceforth referred to as "environment"). Community operation is thus performed on the instantiated templates, allowing different users to customize the underlying process based on the observed environment. In a preferred approach, at all times, the modifications are continuously monitored and ranked to maximize the accuracy of the evolving models.

Figure 1:
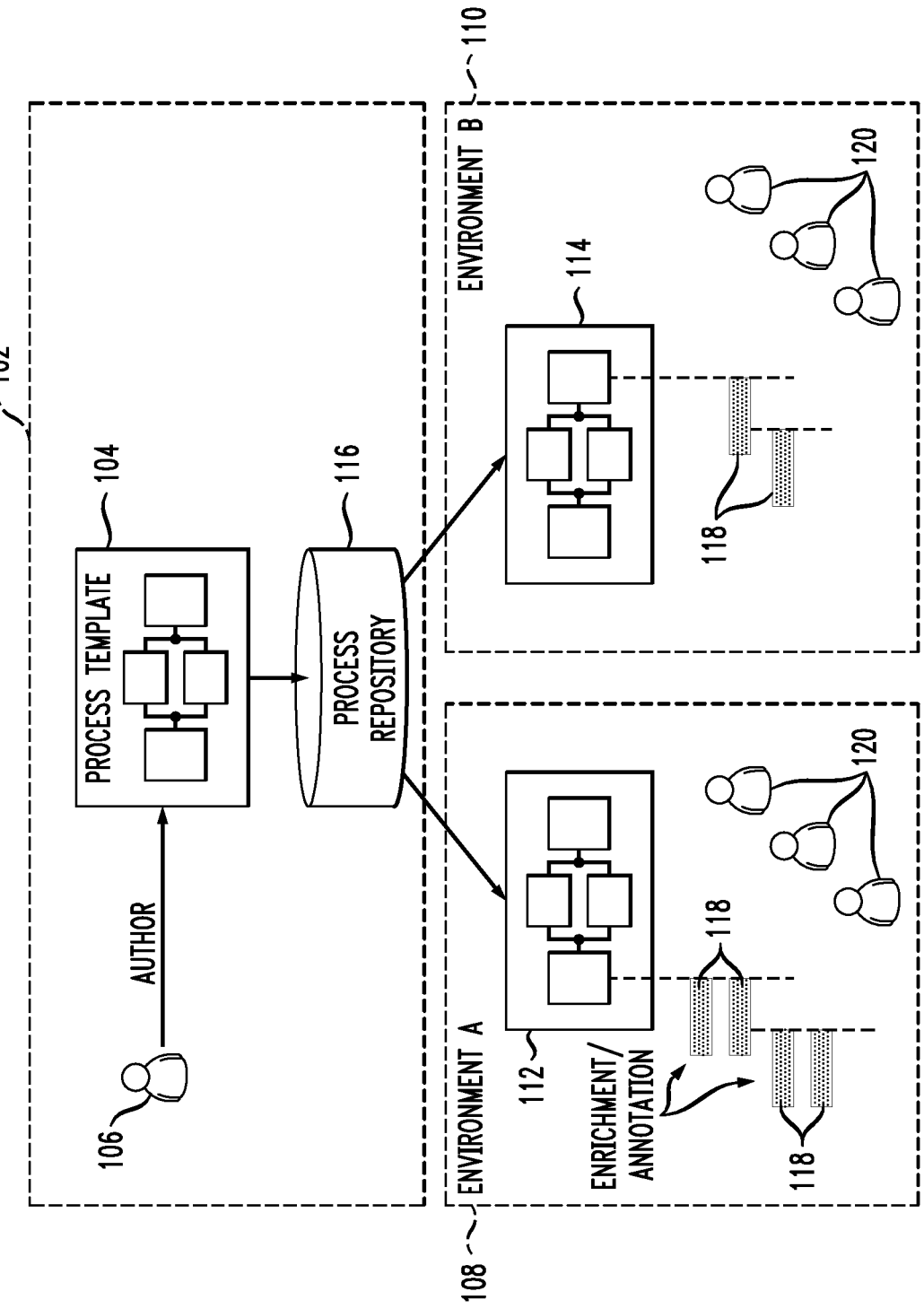
FIG. 1 shows exemplary steps in community process modeling and enrichment, according to an aspect of the invention.

FIG. 1 captures the basic steps in community process modeling and enrichment, according to an aspect of the invention. A distinction should be made between (i) the authoring phase 102, where the base templates 104 (only a single template 104 is depicted, for illustrative convenience) are being generated by an author 106 (or multiple authors), and (ii) the publishing phase, where the instantiated templates are being enriched and rated in a plurality of environments, such as 108 and 110.

There is great flexibility in defining the template processes. Ideally, every type of captured information is appropriately tagged (for example, identifying the resources, roles, and the like). Once these templates 104 are published, each environment is able to operate on an instance (or copy) of the base templates, such as instance 112 in environment 108 and instance 114 in environment 110, allowing controlled modifications to the template 104. Base templates 104 may be stored, for example, in process repository 116. Annotation of the instantiated templates is indicated by blocks 118 which may be applied by one or more users 120 (blocks 118 refer to tags to annotations as will be discussed below with regard to FIG. 2).

Figure 2:
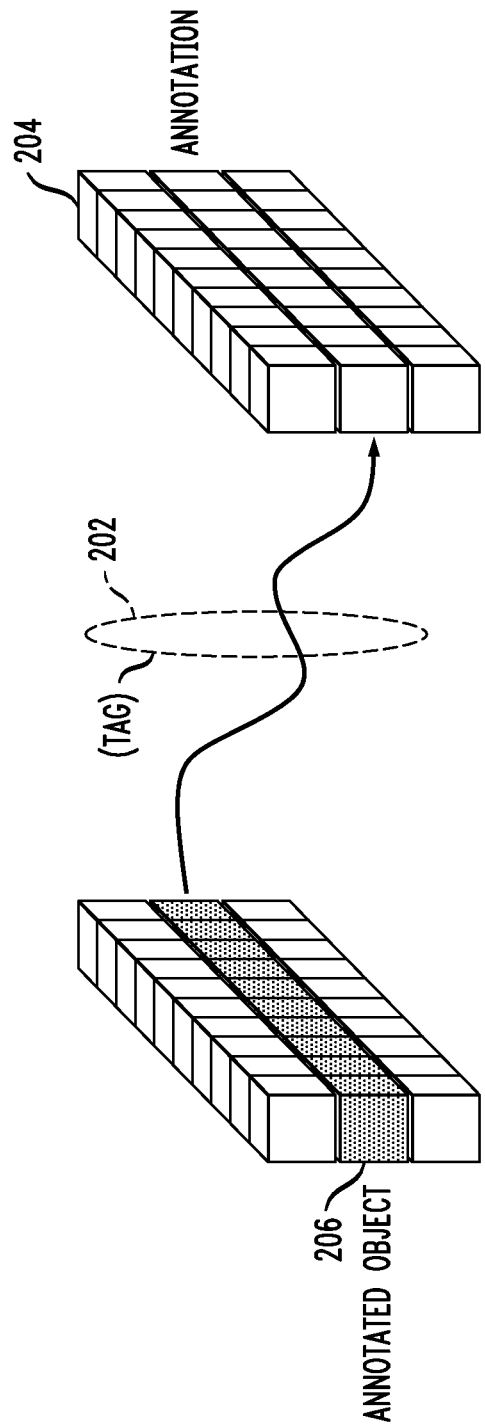
FIG. 2 shows an example of multiple tagging, according to another aspect of the invention.

Attention should now be given to FIG. 2. To support the capabilities described above, one or more embodiments of the invention enable multi-tagging of process tasks to support templatization, enrichment, and/or concurrent modification of processes. Instead of making multiple copies of the template process, one or more embodiments introduce multiple tags (referred to herein as "multi-tags") as a technique for allowing the user to specify the scope of the annotation.

Specifically, the starting point is the base template 104, which includes process, organization, roles, and the like. An annotation can contain two types of information: (i) multi-dimensional content and/or (ii) multi-dimensional tags. The tag 202 thus defines the link between the annotation 204 and the annotated template 206; each dimension in the tag 202 can represent a different type of information (for example, accounts, groups, and the like).

One significant aspect is the definition of how tags 202 are constructed. Tags 202 represent different types of information, which also includes time. Users 120 can associate multiple tags 202 with any type of annotation 204 (for example, Information X is only applicable to Role Y when working on Account Z). The combination of the template 104 and all annotations 204 thus constitutes an instantiation 112, 114.

Depending on how tags 202 are defined, they can reflect user interests and/or profiles. A profile, for instance, can include in what accounts a user is involved. By examining all defined tags 202, tags 202 can be automatically grouped and combined, such that it is possible to allow a given user 120 to select and/or deselect particular tags 202 based on his or her job needs (for instance). When tags 202 are "scoped out" (that is, not selected in a case where the user selects desired tags, or deselected in a case when the default is selection of all tags), the link between the annotated object 206 and the annotation 204 simply disappears from the user's view. If a user 120 selects multiple tags 202, all relevant tags can be combined and ranked based on their closeness to the use's profile.

Figure 3:
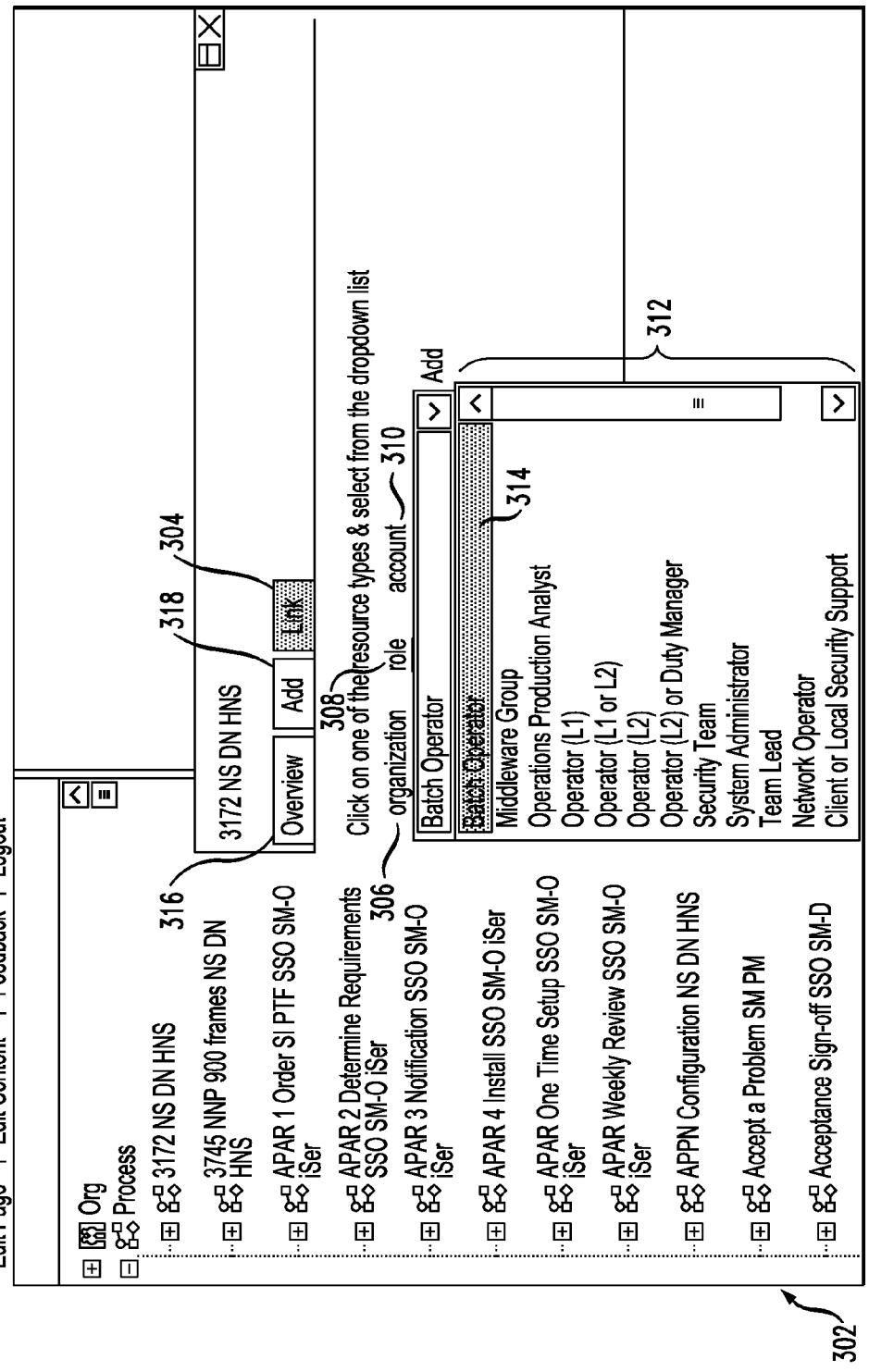
FIGS. 3 and 4 show non-limiting examples of how a user can define annotation tags, according to yet another aspect of the invention.
Figure 4:
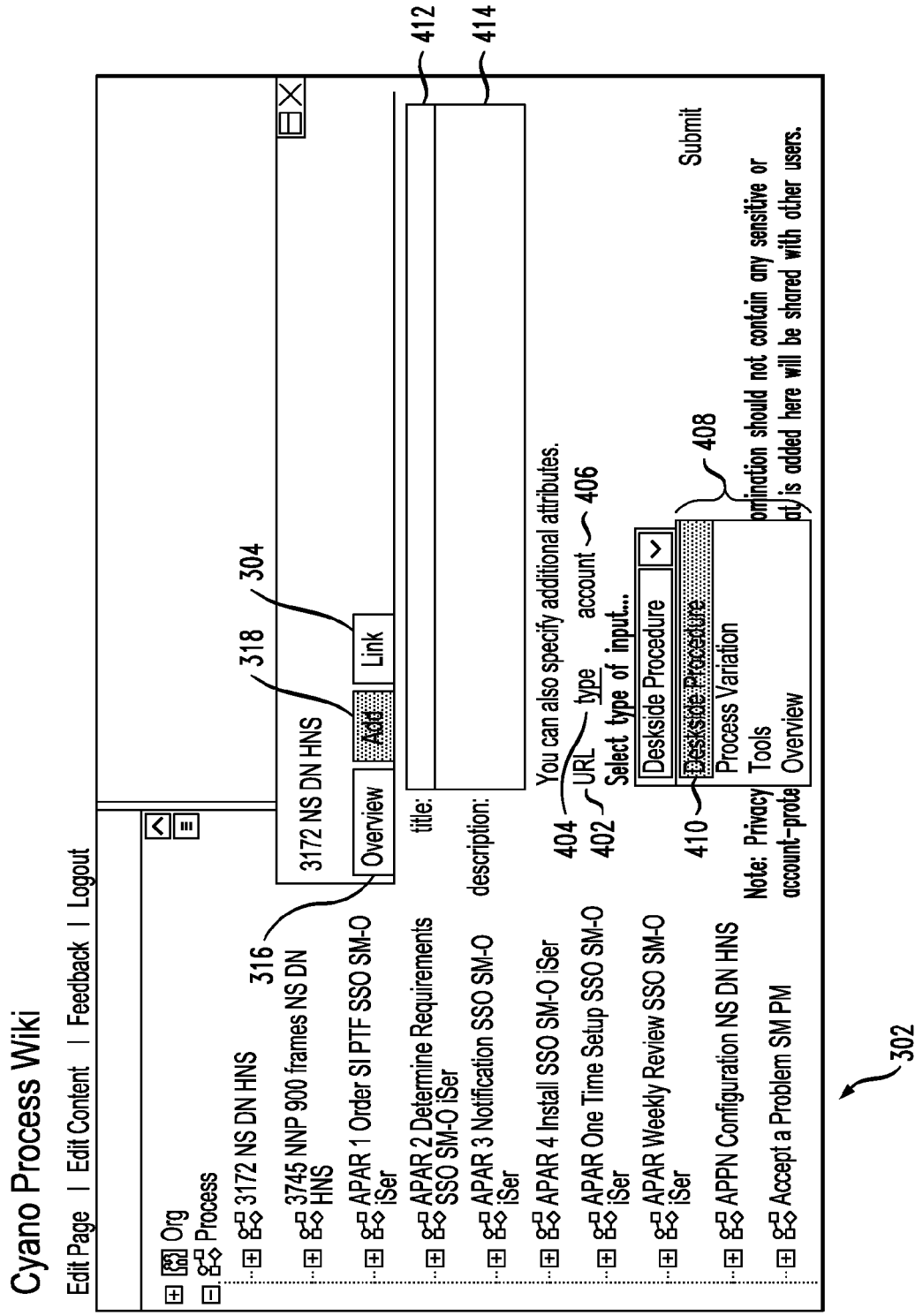

FIGS. 3 and 4 show examples of how a user can define annotation tags. In FIG. 3, a new link is being defined for a process in tree form 302. "Link" tab 304 is highlighted (other options include "overview" 316 and "add" 318). The user has the option to work on a link associated with an organization 306, role 308, or account 310. Role 308 has been selected by clicking, as indicated by being underlined. The user now selects one of the resource types from dropdown list 312; in this case, "batch operator" 314.

In FIG. 4, the user 120 will now add an attribute, as indicated by the highlight of tab 318. The attribute can be, for example, a URL 402, a "type" 404, or an account 406. Here, "type" has been clicked and is underlined, and the user can select a type of input from dropdown list 408; in this case, a desk-side procedure 410 has been highlighted. A title and description 412, 414 may be entered in due course.

Figure 6:
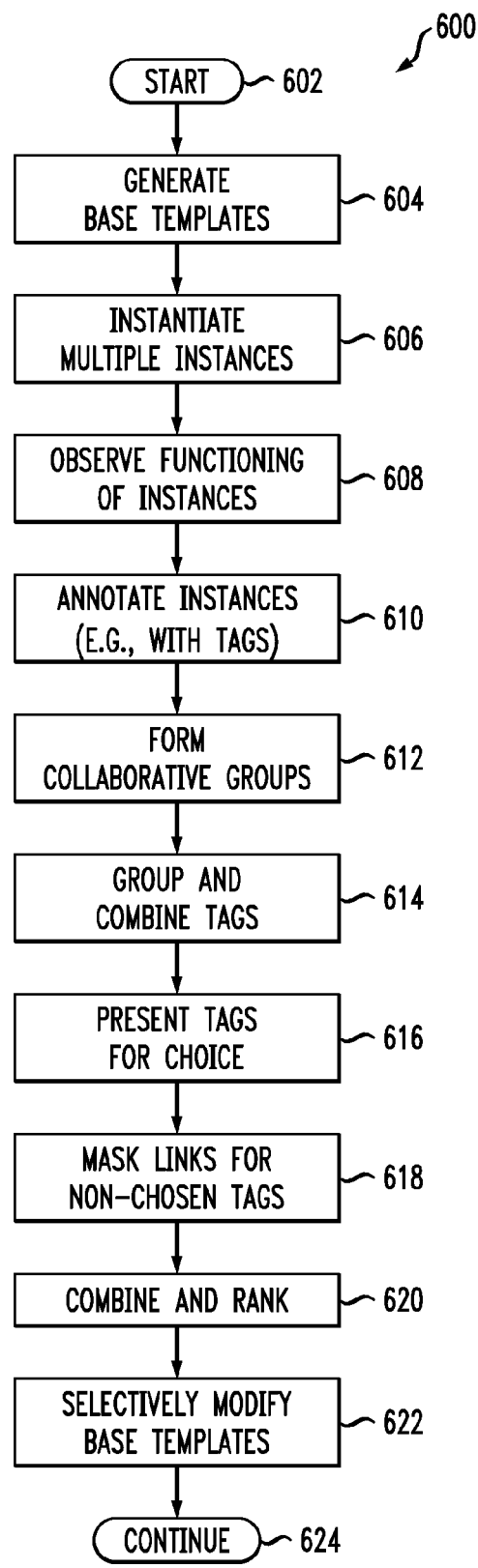
FIG. 6 depicts exemplary method steps, according to still another aspect of the invention.

FIG. 6 shows a flow chart 600 of exemplary method steps. In view of the description of FIGS. 1-4, and with reference to FIG. 6, the skilled artisan will appreciate that, in general terms, after beginning at block 602, an exemplary inventive method for dynamic structuring of process annotations includes the step 604 of generating a plurality of base templates 104. Each of the base templates models a corresponding process. The method further includes step 606, instantiating a plurality of instances 112, 114 of each of the base templates 104. Each of the plurality of instances 112, 114 corresponds to an application of the corresponding process to a particular environment 108, 110, respectively. The method still further includes the step 610 of annotating each of the instances 112, 114 of each of the base templates 104, based, in each case, upon observation of functioning of the instance 112, 114 in the particular environment 108, 110. Such observation might be carried out, for example, as in step 608. Annotation can be carried out, for example, as described with regard to FIGS. 2-4.

Environments 108, 110 can be, for example, specific technologies, accounts, projects, and the like. In some instances, an additional step 622 can include selectively modifying the base templates 104 (for example, in repository 116) based upon the annotated instances 112, 114 of the base templates 104. However, this step is optional, and in other instances, base templates in repository 116 may remain unchanged. Processing continues at block 624.

The aforementioned annotations may include, for example, multi-dimensional content and/or multi-dimensional tags. The multi-dimensional tags can define a link between (i) a given one of the annotations 204 and (ii) a corresponding one of the instances of the base templates 112, 114 to which the annotation refers (see depiction of annotated object 206). The multi-dimensional tags may refer to a plurality of different dimensions, each corresponding to a different type of information (for example, accounts, groups, and/or time). One or more of the annotations 204 can have more than one of the multi-dimensional tags 202 associated with them. As noted above, the combination of the template 104 and all annotations 118 constitutes an instantiation 112, 114. As also noted above, instead of making multiple copies of the template process, one or more embodiments of the invention introduce multi-tags 202 as a technique for allowing the user 120 to specify the scope of the annotation 204. It should be noted at this point that these statements are not contradictory. The latter statement indicates that, in some instances, one annotation 204 can be multiply tagged, so that it can apply to different instantiations, for example, both 112 and 114. The former statement indicates that one or more tags 202 can be used to create a single instantiation (for example, either 112 or 114). In a non-limiting exemplary embodiment, if there is a template process and an annotation 204, it can be tagged, for example, with "account A" and "account B." The instantiation for account A would combine the base (which may or may not be copied) and all annotations tagged with account A.

The tags 202 may reflect, for example, interests and/or profiles of corresponding users 120; the profiles may in turn reflect accounts the users are involved in. In a case where the tags reflect at least profiles of the users, an additional step 612 can include forming a plurality of collaboration groups, based on similarity of the profiles reflected by the tags 202. Also in a case where the tags reflect at least profiles of the users, additional optional method steps include (a) step 614, grouping and combining the tags 202; (b) step 616, presenting the tags 202 to a given one of the users 120 for selection and/or de-selection; and (c) step 618, masking the links between (i) the given one of the annotations 204 and (ii) the corresponding one of the instances 112, 114 of the base templates 104 to which the annotation refers, for those of the tags that have been (i) not selected or (ii) de-selected, as the case may be. In a case where at least two of the tags 202 have been (i) selected or (ii) not de-selected, a group of at least two active tags is thus formed, and an additional step 620 can include combining and ranking the at least two active tags, based on closeness to a corresponding one of the user profiles. With regard to steps 616 and 618, the choice can be, for example, to de-select undesired tags when the default is for all tags to be selected, or to select desired tags when the default is for all tags to be de-selected Exemplary System and Article of Manufacture Details A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 5:
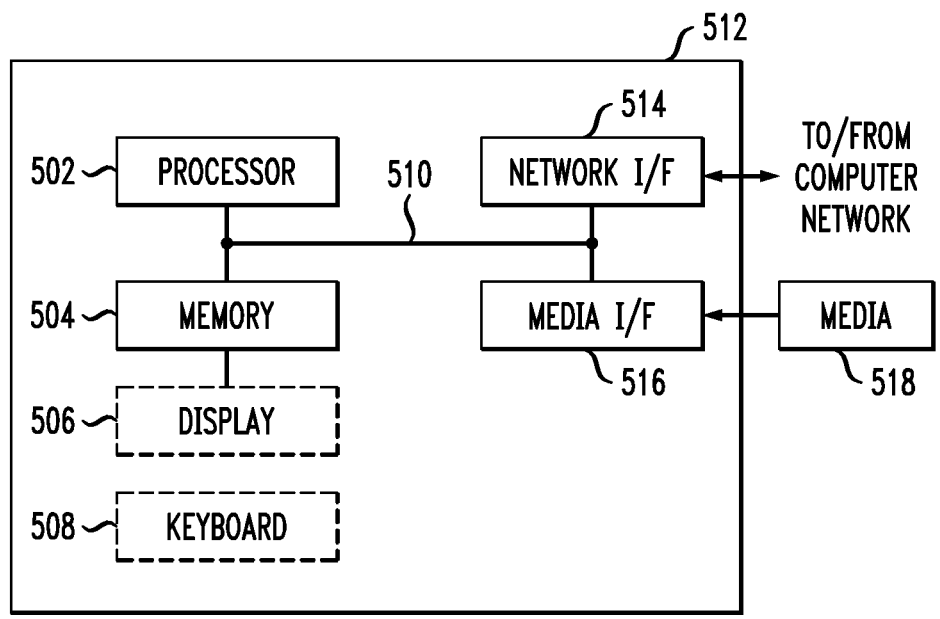
FIG. 5 depicts a computer system that may be useful in implementing one or more aspects and/or elements of the present invention.

One or more embodiments can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 518) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a computer-readable medium include a semiconductor or solid-state memory (for example memory 504), magnetic tape, a removable computer diskette (for example media 518), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 502 coupled directly or indirectly to memory elements 504 through a system bus 510. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for dynamic structuring of process annotations, said method comprising the steps of:
    generating a plurality of base templates, each of said base templates modeling a corresponding process;
    instantiating a plurality of instances of each of said base templates, each of said plurality of instances corresponding to an application of said corresponding process to a particular environment; and
    annotating each of said instances of each of said base templates, based, in each case, upon observation of functioning of said instance in said particular environment, wherein one or more steps of said method are performed by one or more hardware devices.

2. The method of claim 1, wherein said environment comprises at least one of a specific technology, an account, and a project.

3. The method of claim 1, further comprising the additional step of selectively modifying said base templates based upon said annotated instances of said base templates.

4. The method of claim 1, wherein said annotating comprises annotating with annotations comprising at least one of multi-dimensional content and multi-dimensional tags.

5. The method of claim 4, wherein said multi-dimensional tags define a link between (i) a given one of said annotations and (ii) a corresponding one of said instances of said base templates to which said annotation refers.

6. The method of claim 5, wherein said multi-dimensional tags refer to a plurality of different dimensions each corresponding to a different type of information.

7. The method of claim 6, wherein said different types of information comprise at least one of accounts, groups, and time.

8. The method of claim 5, wherein at least some given ones of said annotations have multiple ones of said multi-dimensional tags associated therewith.

9. The method of claim 5, wherein said tags reflect at least one of interests and profiles of corresponding users.

10. The method of claim 9, wherein said profiles reflect accounts said users are involved in.

11. The method of claim 9, wherein said tags reflect at least profiles of said users, further comprising the additional step of forming a plurality of collaboration groups, based on similarity of said profiles reflected by said tags.

12. The method of claim 9, wherein said tags reflect at least profiles of said users,
further comprising the additional steps of:
   grouping and combining said tags;
   presenting said tags to a given one of said users for at least one of selection and de-selection; and
   masking said links between (i) said given one of said annotations and (ii) said corresponding one of said instances of said base templates to which said annotation refers, for those of said tags that have been at least one of (i) not selected and (ii) de-selected.

13. The method of claim 12, wherein at least two of said tags have been at least one of (i) selected and (ii) not de-selected, forming a group of at least two active tags, further comprising the additional step of combining and ranking said at least two active tags based on closeness to a corresponding one of said user profiles.

14. A system for dynamic structuring of process annotations, said system comprising:
   means for generating a plurality of base templates, each of said base templates modeling a corresponding process;
   means for instantiating a plurality of instances of each of said base templates, each of said plurality of instances corresponding to an application of said corresponding process to a particular environment; and
   means for annotating each of said instances of each of said base templates, based, in each case, upon observation of functioning of said instance in said particular environment.

15. The system of claim 14, wherein said environment comprises at least one of a specific technology, an account, and a project.

16. The system of claim 14, further comprising means for selectively modifying said base templates based upon said annotated instances of said base templates.

17. The system of claim 14, wherein said means for annotating comprise means for annotating with annotations comprising at least one of multi-dimensional content and multi-dimensional tags.

18. A computer program product comprising a computer useable medium including computer usable program code for dynamic structuring of process annotations, said computer program product including:
   computer usable program code for generating a plurality of base templates, each of said base templates modeling a corresponding process;
   computer usable program code for instantiating a plurality of instances of each of said base templates, each of said plurality of instances corresponding to an application of said corresponding process to a particular environment; and
   computer usable program code for annotating each of said instances of each of said base templates, based, in each case, upon observation of functioning of said instance in said particular environment.

19. The computer program product of claim 18, wherein said environment comprises at least one of a specific technology, an account, and a project.

20. The computer program product of claim 18, further comprising computer usable program code for selectively modifying said base templates based upon said annotated instances of said base templates.

21. The computer program product of claim 18, wherein said computer usable program code for annotating comprises computer usable program code for annotating with annotations comprising at least one of multi-dimensional content and multi-dimensional tags.

22. A system for dynamic structuring of process annotations, said system comprising:
   a memory; and
   at least one processor, coupled to said memory, and operative to
      generate a plurality of base templates, each of said base templates modeling a corresponding process;
      instantiate a plurality of instances of each of said base templates, each of said plurality of instances corresponding to an application of said corresponding process to a particular environment; and
      annotate each of said instances of each of said base templates, based, in each case, upon observation of functioning of said instance in said particular environment.

23. The system of claim 22, wherein said environment comprises at least one of a specific technology, an account, and a project.

24. The system of claim 22, wherein said processor is further operative to selectively modify said base templates based upon said annotated instances of said base templates.

25. The system of claim 22, wherein said processor is operative to annotate by annotating with annotations comprising at least one of multi-dimensional content and multi-dimensional tags.

* * * * *